June 4, 1957  J. H. EAGLE  2,794,360
COMBINATION LENS ATTACHMENT
Filed Nov. 12, 1953  2 Sheets-Sheet 1

John H. Eagle
INVENTOR.

BY
ATTORNEYS

June 4, 1957  J. H. EAGLE  2,794,360
COMBINATION LENS ATTACHMENT
Filed Nov. 12, 1953  2 Sheets-Sheet 2
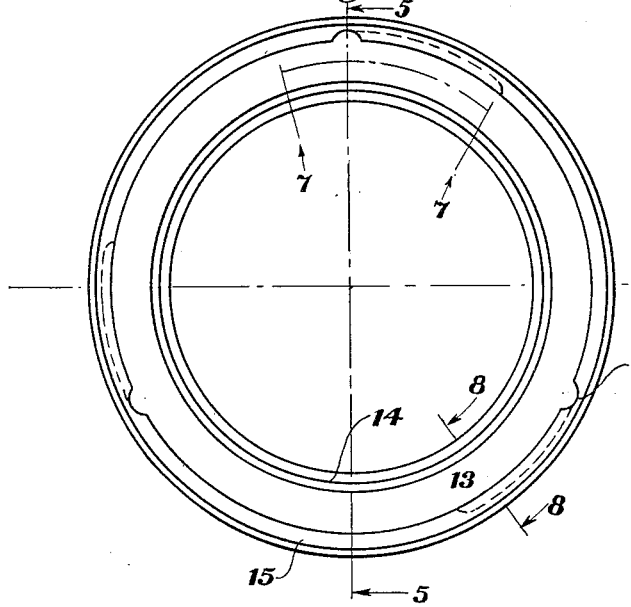
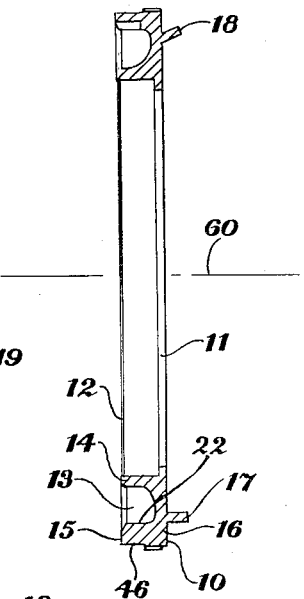
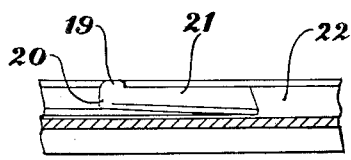
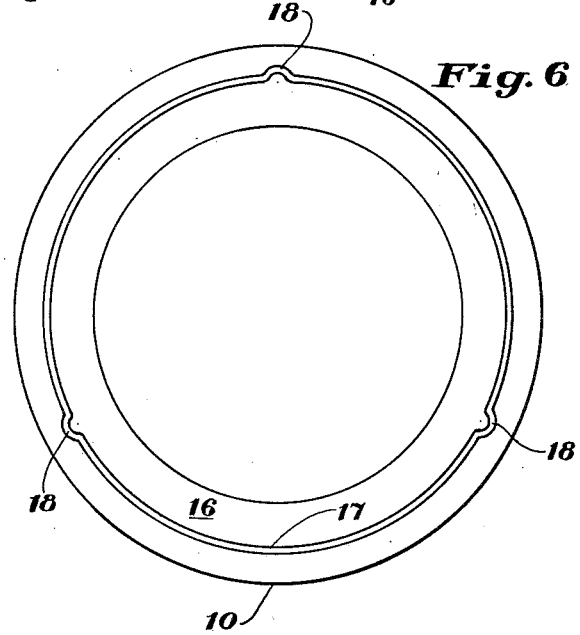
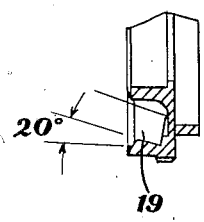
John H. Eagle
INVENTOR.
BY
ATTORNEYS United States Patent Office 2,794,360
Patented June 4, 1957

2,794,360

COMBINATION LENS ATTACHMENT

John H. Eagle, Rochester, N. Y., assignor to Eastman Kodak Company, Rochester, N. Y., a corporation of New Jersey Application November 12, 1953, Serial No. 391,590

2 Claims. (Cl. 88—1)

The present invention relates to a combination lens attachment, and more particularly to a combined lens hood, filters and adapter attachment for use on a camera.

The present invention has as its principal object the provision of an adapter, a filter series and lens hood arrangement such that the filter and adapter may be assembled in a tandem or nesting relation and placed inside the lens hood for a compact carrying arrangement.

Another object of the invention is the provision of a closure cap which is designed not only to close one end of the hood, but also to support the hood, the adapter and filter series.

A further object of the invention is the provision of a pair of closure caps for the lens hood, the adapter and filter series which are connected directly to and supported on the lens hood.

To these and other ends, the invention resides in certain improvements and combinations of parts, all as will be hereinafter more fully described, the novel features being set forth in the claims at the end of the specification.

In the drawings:

Fig. 4 is a front view of one of the filter mounts or elements, showing the relation of the female bayonet lock element thereof;

Fig. 5 is a transverse view through the filter element illustrated in Fig. 5 and taken substantially on line 5—5 thereof, showing the relation of the parts;

Fig. 6 is a rear view of the filter element illustrated in Fig. 4, showing the relation of male bayonet lock elements;

Fig. 7 is a partial transverse view through the filter element illustrated in Fig. 4, and taken substantially on line 7—7 thereof, showing the structure of one of the bayonet lock slots;

Fig. 8 is a partial transverse view through the filter element illustrated in Fig. 4, and taken substantially on line 8—8 thereof, showing the relation of the entrance to the bayonet slot and the angular relation to the center line of the element.

Similar reference numerals throughout the various views indicate the same parts.

Figure 1:
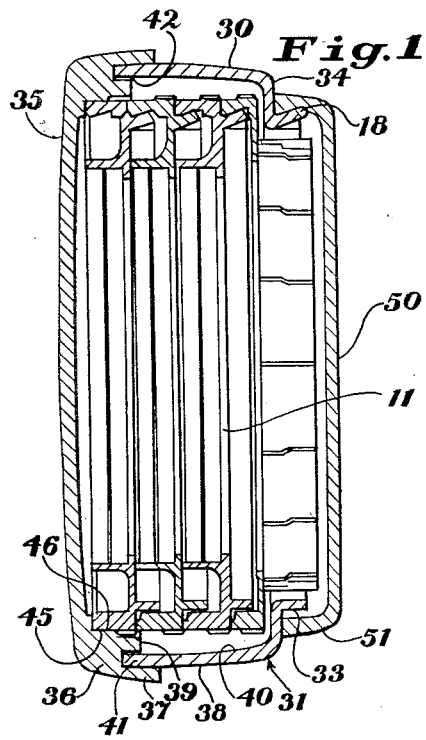
Fig. 1 is a transverse sectional view through the lens attachment with its closure caps in position.

The present invention relates to a lens hood, filter and adapter assembly or combination and suitable closure caps for positioning and retaining the parts in a compact carrying arrangement. As several of the elements are all identical in structure, only one will be described in detail, and corresponding parts of the other elements will be designated by the same numerals.

Each filter is in the form of a ring 10 in which the filter 11, of any suitable color, is positioned. The ring 10 is relatively thick radially, and the front 12 is formed with an annular slot 13 to provide a pair of radially spaced walls 14 and 15, as best shown in Fig. 5. The rear face 16 of each ring 10 is formed with an axially extending ring 17 of smaller diameter than ring 15 but of larger diameter than ring 14, as shown in Fig. 5 and to be later more fully described. The ring 17 has portions, in the present instance three, which are embossed or upset to form circumferentially spaced male bayonet members 18 of a bayonet lock, the purpose of which structure will be later described.

The wall 15 of each filter element is formed with three circumferentially-spaced inwardly extending openings 19 which are spaced to correspond with the spacings of the embossings 18. From the inner end 20 of each opening 19 a slot 21 extends helically along the inner surface 22 of wall 15 to form the female member of the bayonet lock, as best shown in Figs. 7 and 8.

An adapter 25 is similar in structure to the filter above described except that the inner wall 14 of the filter is omitted thereon. Also, the rear ring 17a of the adapter 25 is larger axially than ring 17 of the filter element, and is formed with a plurality of axially extending slots 26 to make the ring 17a somewhat flexible to facilitate placing the adapter over the lens mount of a camera, as is deemed apparent. Also the embossing 18 are omitted from ring 17a. The inner surface 27 of the ring 15 of the adapter is substantially equal to the outer diameter of the ring 17 of the filter and is provided with slots 19 and 21 which cooperate with the embossing 18 of the ring 17 of one of the filters to provide a bayonet lock to connect the adapter detachably to the filter, as clearly illustrated in Figs. 1 and 2.

Figure 2:
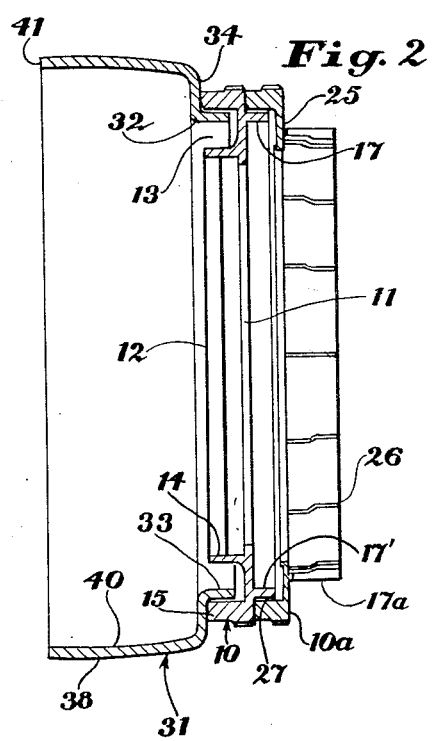
Fig. 2 is a transverse sectional view through the lens hood, with the closure caps removed and certain of the elements connected to the lens hood.
Figure 3:
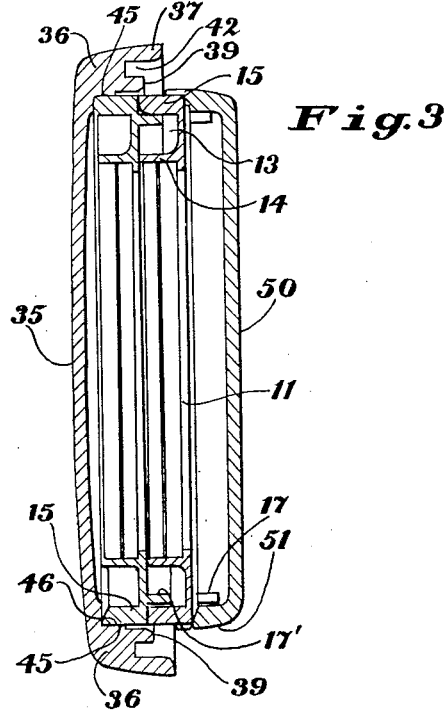
Fig. 3 is a view similar to Fig. 1, but with the lens hood and certain of the elements, shown in Fig. 2, removed, and the remaining elements positioned between and protected by the end closure caps.

When the filters are assembled, the ring 17 of one filter is inserted into the slot 13 of another filter, and the embossings 18 are brought into registry with the openings 19 of the adjacent filter. The embossings 18 are passed axially through the openings 19 and into the slots 21. Relative rotative movement of the filters causes embossings 18 to move along the slots 21 to connect the filters, as is deemed apparent. In a like manner, the adapter 25 is connected to the rear filter member by inserting the rear ring 17 of the rear filter into the flange 10a of the adapter 25 as illustrated in Fig. 2. The embossings 18 on the ring 10a of the adapter cooperate with the openings 19 and slots 21 of the adjacent ring 17 of the filter element to connect the adapter to the filter. The assembled filters and adapter are in the assembled or nesting relation shown in Fig. 1.

The assembly filter elements and adapter are than placed within a cylindrical portion 30 of a lens hood, generally indicated by the numeral 31. The internal diameter of the portion 30 is of sufficient size to receive freely the assembled filters and adapters as shown in Fig. 1. The slotted ring 26 of the adapter 25 extends through a rear opening 32 in the back of the portion 30, and through a smaller diameter axially extending ring 33 which projects from the rear surface 34 of the portion 30, as best shown in Figs. 1 and 2.

A front closure cap, broadly designated by the numeral 35, is provided to close the front or left end of the lens hood portion 30, see Fig. 1. This cap is provided with a thickened ring position 36 having an outer axially extending annular flange 37 which overlies the outer surface 38 of the portion 30, and a concentric annular flange 39 which is spaced from the flange 37, see Fig. 1, and overlies the inner surface 40 of portion 30 adjacent to front edge 41. The flanges 37 and 39 are spaced radially to provide a circumferential groove 42 adapted to receive the front end 41 of the portion 30, as shown in Fig. 1. The flanges 37 and 39 are spaced radially a distance such as to receive the front end 41 of the portion 30 snugly to form a friction fit therewith to position the cap 35 in closing position on the portion 30, and to secure the cap frictionally thereon, all as will be deemed apparent from an inspection of Fig. 1.

In addition to closing the front end of portion 30, the front cap 35 also serves to support the front end of the filter and adapter assembly. To secure this result the inner surface 45 of the inner flange 39 is substantially equal in diameter to the outer surface 46 of the ring 15 of the filters so that the ring 15 on the front filter will engage frictionally with the surface 45 to support the front end of the filter and adapter assembly on the front cap and to position assembly relative thereto.

The rear of the lens hood is closed by a rear closure cap having a flat or radially extending portion 50 which extends over and closes the rear of ring 33, and has an annular axially-extending rim 51 which overlies ring 33, see Fig. 1. The rim 51 is provided with openings and slots, not shown, similar to the openings and slots 19 and 21 of the filter, which cooperate with embossings 18 on the rim 33 of the hood to connect the cap 50 detachably to the hood, all as shown in Fig. 1. Thus, the front cap 35 closes the front end of the lens hood and serves to support the latter and the assembly, while the rear of the lens hood is closed by cap 50 to provide a tight dirt-proof container for the filter and adapter.

When the parts are to be attached to a camera, the two caps 35 and 50 are first removed, and the filter and adapters are withdrawn from the lens hood. If only some of the filters are to be used, the individual filters are detached. Fig. 2 shows an assembly of one filter and an adapter attached to the lens hood. The desired filters are connected as a unit to the ring 33 of the hood by means of the above-described bayonet lock arrangement. The remaining two unused filters may be sealed in the container formed by the caps 35 and 50, the front cap being held to the front filter by means of the surface 45 of the inner flange 39 while the rear cap 50 is connected to the rear filter by means of the above-described bayonet locks. Thus, the adapter and any desired number of filters may be connected to the lens hood, and the unused filters may then be placed in position between caps 35 and 50 to protect the unused filters from dirt.

Thus, the present invention provides a support and closure for a lens hood to seal the latter and to support a filter and adapter assembly positioned inside the hood. When the hood and adapter are in use, the closure caps support, enclose, and protect the unused filters. The lens hood, filter rings, and adapter may be made of any suitable material, such as metal or plastic. When made of metal, the male portions or embossings 18 of the bayonet lock may be formed by crimping the metal outward at the three embossed points. However, if they are made of plastic, the embossings may be molded with sections in the mold. The female portions of the bayonet lock, openings 19 and 21, may be generated by three cylindrical milling cutters located at 20° with respect to the part center line, as indicated in Fig. 8. These cutters enter into the proper depth by moving parallel to the center line 60, Fig. 5 of the part, and thus generate three openings 19. The filter ring and cutter are then rotated relatively on center line 60 so that the cutters and ring move in a helical relation to generate the helical slots of grooves 21. The cutters would be removed by reversing this procedure. Other means may, of course, be used for forming the bayonet lock members, and the above-described process or method is to be considered only as illustrative of one method and not to be intended as a limitation.

While one embodiment has been disclosed, it is to be understood that the inventive idea may be carried out in a number of ways; therefore, this application is not intended to be limited by the above details described, but is intended to cover all variations and modifications which fall within the scope of the appended claims.

I claim:

1. A closure for a lens hood formed with a tubular portion, a cap overlying and closing one end of said portion, an annular axially extending rim section on said cap, means on said section engaging and cooperating with complementary parts of said portion adjacent said one end to connect said cap frictionally and detachably to said one end of said portion, a second cap frictionally engaging said portion adjacent the opposite end thereof to close said opposite end, a plurality of annular members positioned within said portion, interengaging bayonet locks on said members to connect the latter in assembled unitary relation, and cooperating elements on said first cap and one of said members to connect the assembled member to and to support the assembled members on said cap for movement as a unit therewith when said first cap is disconnected from said portion.

2. A closure for a combination lens attachment comprising, a lens hood formed with a tubular portion, a cap overlying and closing one end of said portion, an annular rim on said cap extending toward said portion, said rim being formed with an annular groove positioned to receive said one end of said portion, radially spaced inner and outer annular walls arranged on opposite sides of said groove and engaging the inner and outer surfaces respectively of said portion adjacent said one end to connect said cap frictionally and detachably to said one end of said portion, a plurality of tubular members positioned within said portion, bayonet lock means for connecting said member releasably in assembled unitary relation, means on one of said members engaging said inner wall frictionally to position and support said assembled members as a unit on said cap, said members being movable as a unit with said cap when the latter is disconnected from said portion, and a second cap frictionally engaging said portion adjacent the opposite end thereof to close said opposite end.

References Cited in the file of this patent

UNITED STATES PATENTS

| | | |
|---|---|---|
| 924,890 | Converse | June 15, 1909 |
| 1,971,434 | Trautmann | Aug. 28, 1934 |
| 2,218,884 | Kellner | Oct. 22, 1940 |
| 2,401,367 | Nagel | June 4, 1946 |
| 2,582,815 | Bolsey | Jan. 15, 1952 |
| 2,606,586 | Hill | Aug. 12, 1952 |
| 2,693,307 | Goodwin | Nov. 2, 1954 |

FOREIGN PATENTS

| | | |
|---|---|---|
| 258,866 | Switzerland | Dec. 31, 1948 |